(No Model.) 2 Sheets—Sheet 1.

J. J. HILL.
MACHINE FOR SHELLING AND GRADING PEANUTS, &c.

No. 328,032. Patented Oct. 13, 1885.

ATTEST
Frank W. Burnham.
Leonard Vassall.

INVENTOR
John J. Hill
By Parkinson & Parkinson
his attorneys (No Model.)  2 Sheets—Sheet 2.
J. J. HILL.
MACHINE FOR SHELLING AND GRADING PEANUTS, &c.
No. 328,032.  Patented Oct. 13, 1885.
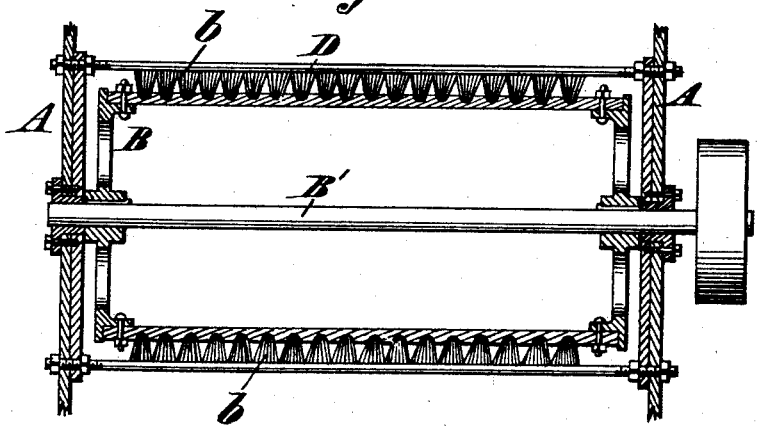
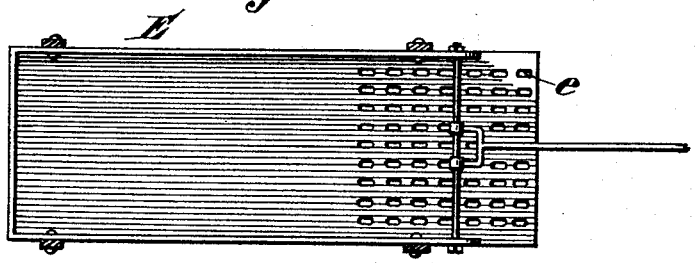
ATTEST
Frank W. Burnham
Leonard Vassall
INVENTOR
John J. Hill
By Parkinson & Parkinson
his attorneys

UNITED STATES PATENT OFFICE.

JOHN J. HILL, OF CLIFTON, OHIO.

MACHINE FOR SHELLING AND GRADING PEANUTS, &c.

SPECIFICATION forming part of Letters Patent No. 328,032, dated October 13, 1885.

Application filed January 16, 1885. Serial No. 153,063. (No model.)

*To all whom it may concern:*

Be it known that I, JOHN J. HILL, a citizen of the United States, residing at Clifton, in the county of Hamilton and State of Ohio, have invented certain new and useful Improvements in Machines for Shelling and Grading Peanuts and other Legumes, of which the following is a specification.

The object of my invention is to provide an efficient machine for shelling and grading peanuts and other legumes; and it consists in the combination and arrangement of parts hereinafter described and claimed.

Figure 1:
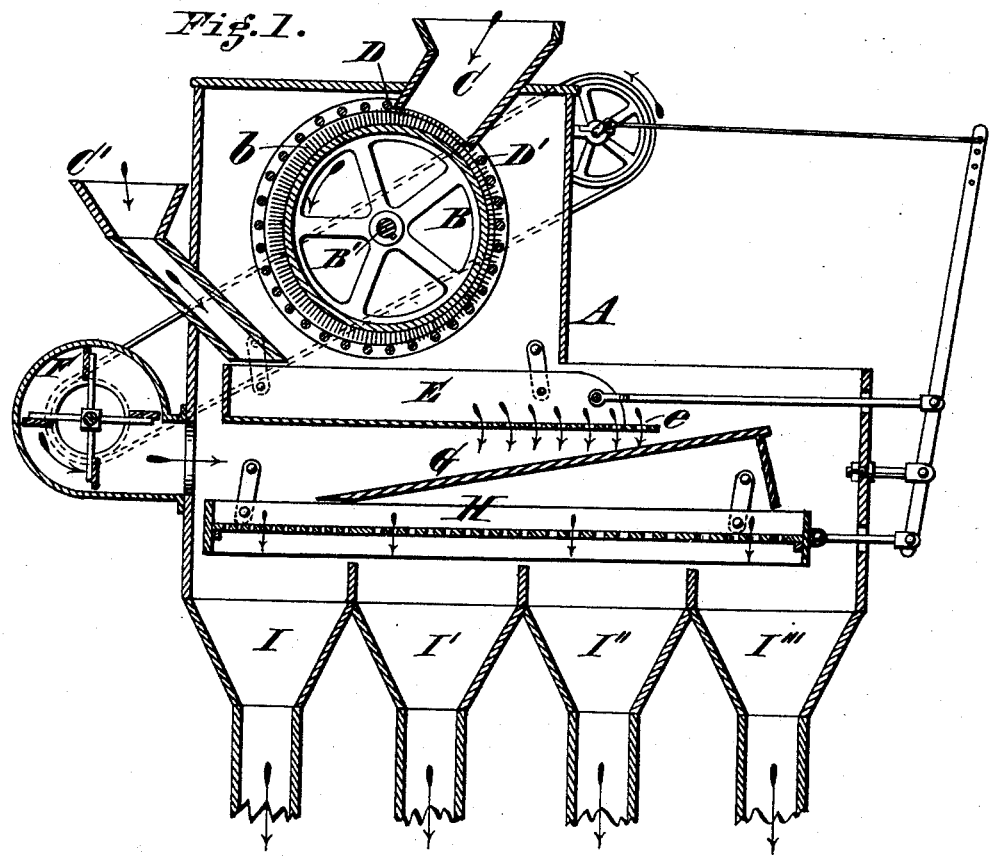
Figure 2:
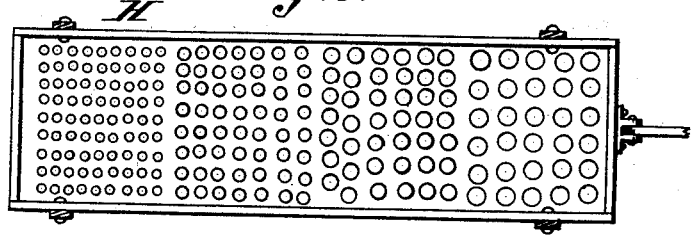
Figure 3:
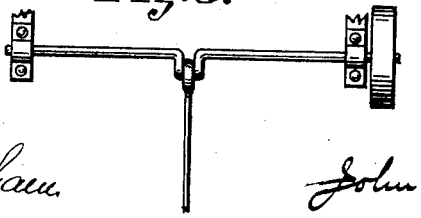

In the drawings, Figure 1 is a longitudinal section of a machine embodying my invention. Fig. 2 is a top plan view of the grading-screen; Fig. 3, a detail of the crank-arm which actuates the shaker and screen; Fig. 4, a sectional view of the shelling device, and Fig. 5 a top plan view of a shaker upon which the nuts or seeds fall as they come from the sheller.

A is a suitable frame or casing, and B a rotary cylinder mounted upon shaft B', and provided upon its outer curved surface with brushes $b$.

C is a hopper or chute, (hereinafter called the "main hopper,") through which the nuts are fed to the shelling device.

D D' is a series of rods or bars fixed to the frame in such position that the brushes upon the rotary cylinder will press the nuts or seeds against said bars with a stress gradually increasing from the point where the nuts enter from the hopper. This may be accomplished by so placing the bars as to form a partial cylinder constructed as an open grate, and journaling the rotary cylinder eccentrically to the surrounding grate; but I prefer to place each bar of the series, from D to D', slightly nearer the rotary cylinder than its predecessor, thus arranging the series in a curve which prolonged would form a scroll.

E is a shaker, having perforations $e$ at its tail end; F, a fan or other instrumentality for affording a blast of air; G, a return-board which carries the nuts that fall from the shaker to the head of the grading screen or separator; H, a grading-screen, the perforations in which are graduated by sections; and I I' I'' I''', a series of spouts so arranged that the nuts or kernels from the finer section of the screen will fall into one spout, those from the next coarser section into another, &c.

In the form shown the rotary cylinder and fan are provided with pulleys to be actuated by power from any suitable source. The shaker and separator are actuated by a pulley, crank-arm, and levers.

The nuts are fed through the main hopper, and are crowded by the rotating cylinder against the rods, the brushes yielding sufficiently to prevent the nuts from being crushed. The nuts and broken shells fall together upon the shaker E, and as they are delivered through the perforations $e$ at the outer end of the shaker the tailings are thrown by the force of the blast over the return-board and into the tailings-spout or other receptacle. The nuts roll or slide down the return-board, and falling upon the head of the grading-screen the smaller ones pass through the finer sections of the screen into spout I, those of the next larger grade through the next coarser series of perforations into spout I', &c.

As it may at times be desirable to pass nuts already shelled through the grader, a secondary hopper or chute, C', leading directly to the shaker, is provided. Instead of covering the entire curved surface of the rotary cylinder with brushes, it may be covered with alternate sections of brushes and of toothed iron plates; but I prefer the brushes, as less likely to break or crush the nuts.

I claim as my invention—

1. In a shelling and grading machine, the combination of a rotary brush-cylinder with a series of fixed bars arranged as an open grate, and so placed that the pods will be crowded against the bars with a stress gradually increasing from the feed onward.

2. In a shelling and grading machine, the combination of a rotary brush-cylinder and a series of fixed bars arranged as an open grate, each bar of the series from the feed onward being slightly nearer the cylinder than its predecessor, with a shaker and fan.

JOHN J. HILL.

Witnesses:
FRANK W. BURNHAM,
LEONARD VASSALL.